United States Patent [19]

Fushiya et al.

[11] Patent Number: 5,054,352
[45] Date of Patent: Oct. 8, 1991

[54] MITER SAW

[75] Inventors: Fusao Fushiya; Katuyasu Ito; Mitsuyoshi Niinomi, all of Anjo, Japan

[73] Assignee: Makita Electric Wroks, Ltd., Anjo, Japan

[21] Appl. No.: 463,489

[22] Filed: Jan. 11, 1990

[30] Foreign Application Priority Data

Jan. 17, 1989 [JP] Japan .................................. 1-9569
Jul. 7, 1989 [JP] Japan ................................ 1-176410

[51] Int. Cl.$^5$ ............................................. B27B 5/20
[52] U.S. Cl. ................................ 83/468.3; 83/471.3; 83/486.1; 83/490
[58] Field of Search ............... 83/468.3, 468.4, 471.3, 83/477.1, 486.1, 490, 574; 74/27

[56] References Cited

U.S. PATENT DOCUMENTS

| | | | |
|---|---|---|---|
| 1,646,589 | 10/1927 | Meek et al. | 83/471.3 |
| 2,559,283 | 7/1951 | Dick, Jr. | |
| 2,902,066 | 9/1959 | Borden | |
| 4,537,105 | 8/1985 | Bergler | 83/471.3 |
| 4,587,875 | 5/1986 | Deley | 83/490 X |
| 4,869,142 | 9/1989 | Sato et al. | 83/471.3 X |

FOREIGN PATENT DOCUMENTS

| | | |
|---|---|---|
| 592461 | 5/1959 | Italy . |
| 62-11526 | 1/1987 | Japan . |
| 136657 | 12/1919 | United Kingdom . |

*Primary Examiner*—Steven C. Bishop
*Attorney, Agent, or Firm*—Dennison, Meserole, Pollack & Scheiner

[57] ABSTRACT

A miter saw including a base for placing a workpiece thereon, a substantially circular turn table mounted on the base, a slide member radially slidably supported in the turn table, an arm mounted to the slide member, and a miter saw unit provided above the turn table and vertically swingably mounted to the arm in such a manner as to be opposed to the turn table. The miter saw unit has a cutting tool such as a circular saw blade and means for driving the cutting tool. A supporting portion of the slide member with respect to the turn table is located at a position in the vicinity of a load application point of the cutting tool.

6 Claims, 8 Drawing Sheets

MITER SAW

BACKGROUND OF THE INVENTION

The present invention relates to a miter saw for cutting a workpiece placed on a base by vertically swinging a rotary tool such as a circular saw located above a turn table or sliding the rotary tool in a radial direction of the turn table.

Such a miter saw has a normal cutting function such that a cutting tool is vertically swung to cut a workpiece and also has an additional push-cutting or draw-cutting function such that the cutting tool is moved horizontally to push-cut or draw-cut the workpiece. Such an additional cutting function is often carried out as well as the normal cutting function.

An example of this type miter saw is disclosed in U.S. Pat. No. 4,537,105, wherein a guide bar retaining member is provided on the turn table, and a guide bar is vertically swingable through a spring by the guide bar retaining member. A motor and a gear case provided with the cutting tool is horizontally movable along the guide bar. In cutting a wide workpiece by moving or expanding the gear case having the cutting tool, a center distance between the cutting tool and a pivotal hinge portion is long, so that a large load is applied to the spring at the pivotal hinge portion, and the cutting tool cannot be retained by the spring. If a spring force of the spring is set to be strong so as to retain the cutting tool under the expanded condition of the gear case, the spring force will become too large to conduct a cutting operation under a short condition of the gear case, with the result that a large force for depressing a handle is required to reduce the operability.

To solve this problem, there has been developed a technique for making a change in spring force of the spring regardless of a moving distance of the cutting tool by sliding the cutting tool for the cutting operation of a wide workpiece and moving the pivotal hinge portion (Japanese Utility Model Laid-open Publication No. 62-11526). In this technique, a turn table is mounted on a base for placing a workpiece thereon, and a guide bar retaining member is provided on the turn table. A guide bar is retained by the guide bar retaining member in such a manner as to be located above the turn table and be horizontally movable. An arm is pivotably mounted to an end of the guide bar, and a cutting tool such as a circular saw or a grinding stone and a motor for driving the cutting tool are mounted to the arm. Thus, the cutting tool located above the turn table is vertically swung with the arm, or is horizontally moved to carry out various cutting operations with respect to the workpiece placed on the base.

However, as mentioned above, the guide bar retaining member is provided on the turn table, and the guide bar is horizontally movably supported by the guide bar retaining member. Furthermore, the cutting tool and the motor is vertically swingably mounted to the end of the guide bar. Accordingly, an overall load of a cutting tool unit including the guide bar, the cutting tool, the motor, etc. is applied to only a supporting portion of the guide bar to the guide bar retaining member. As a result, in the push-cutting or draw-cutting operation, a load application point of the cutting tool unit is located away from the supporting portion, and a large moment is generated at the supporting portion. This moment causes a defect that "tangling" tends to occur at the supporting portion to hinder smooth movement of the guide bar and possible adverse effect to the cutting operation. Accordingly, it is actually necessary to cope with this "tangling" by providing different supporting means at the supporting portion of the guide bar.

SUMMARY OF THE INVENTION

It is accordingly an object of the present invention to provide a miter saw which may ensure smooth movement of the cutting tool in the radial direction of the turn table in the push-cutting or draw-cutting operation.

According to the present invention, there is provided a miter saw comprising a base for placing a workpiece thereon, a substantially circular turn table mounted on said base, a slide member radially slidably supported in said turn table, an arm mounted to said slide member, and a miter saw unit provided above said turn table and vertically swingably mounted to said arm in such a manner as to be opposed to said turn table, said miter saw unit having a cutting tool such as a circular saw blade and means for driving said cutting tool.

The invention will be more fully understood from the following detailed description and appended claims when taken with the drawings.

DETAILED DESCRIPTION OF THE PREFERRED EMBODIMENT

Referring now to FIGS. 1 to 14, a sliding miter saw in accordance with a preferred embodiment of the present invention will be described.

The sliding miter saw 51 is mainly comprised of a fixed base 52 on which a workpiece W is to be carried, a turntable 53 disposed on the fixed base 52, a movable arm 54 attached to a slide bar which is provided slidably in relation to the turntable 53 and will be described later, and a miter saw unit 57 connected to the movable arm 54 pivotally along a vertical path relative to the turntable 53 and including a rotary tool 81 such as a circular saw blade, drive means 56 for driving the rotary tool 81 and others.

As shown in FIGS. 1 to 4, the fixed base 52 is generally a plate-like member which is formed substantially in the central portion thereof with a mounting cavity 58 having a bottom and opening upwardly and in the front and rear sides and with rectangular projections 59 disposed on the right and left sides of the mounting cavity 58 and having upper surfaces constituting workpiece supporting surfaces 59a.

The turntable 53 is a disc-like member and is received in the mounting cavity 58 of the fixed base 52 on the bottom thereof. A locking bolt 60 is rotatably threaded vertically upwardly from under the bottom of the mounting cavity 58 in the substantially central portion of the turntable 53, so that the turntable 53 may be mounted in the mounting cavity 58 rotatably in a predetermined range in relation to the fixed base 52. The turntable 53 has at the front and rear ends thereof straightly cut-out end surfaces corresponding to the front and rear portions of the mounting cavity 58 and an upper surface of the turntable 53 positioned in the same plane as the workpiece supporting surfaces 59a of the projections 59.

The turntable 53 is formed in the upper surface thereof with a cut-out recess 61 extending substantially from the central portion thereof to the front end and adapted to permit intrusion of the rotary tool which will be described later. A cover plate 62 is fitted on the upper surface of the cut-out recess 61 to define an opening having a width corresponding to the rotary tool.

Figure 4:
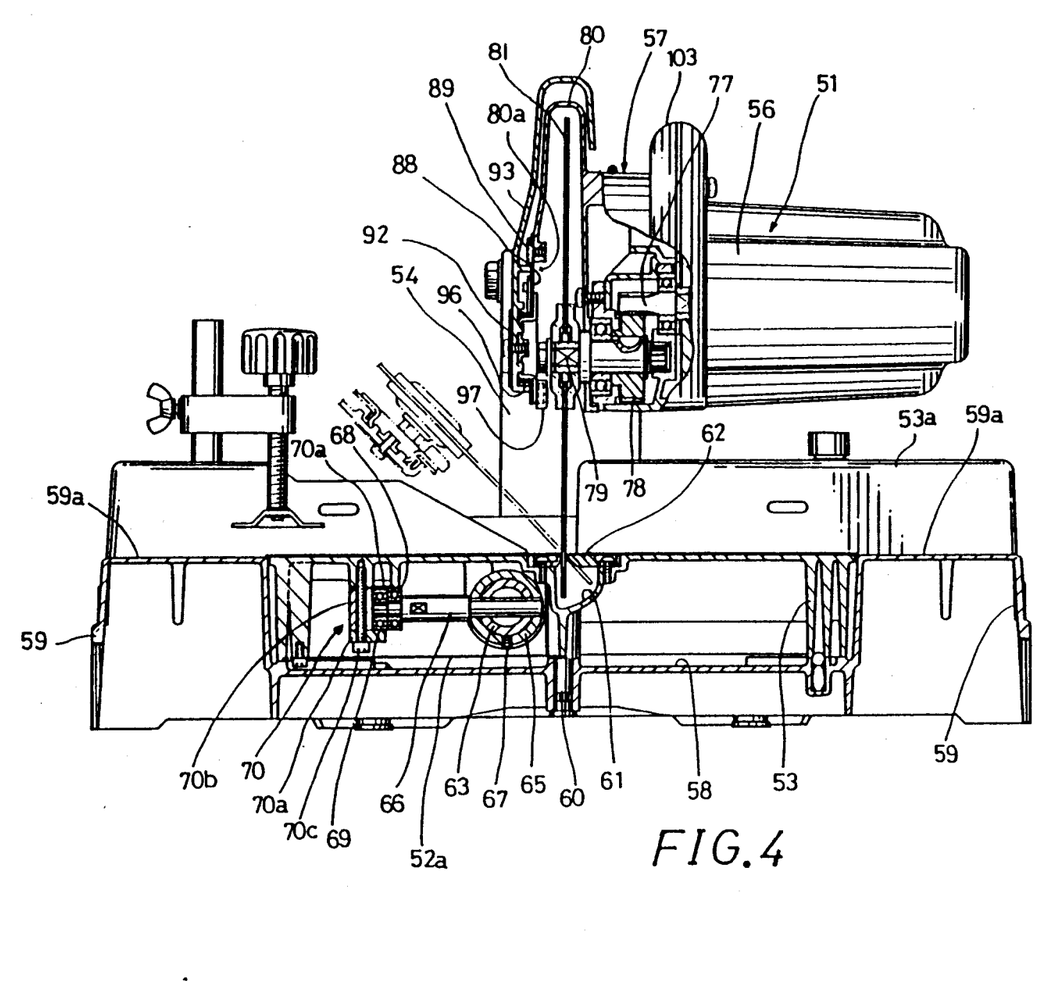
FIG. 4 is a side view partly in section of the sliding bench miter saw in FIG. 1.
Figure 5:
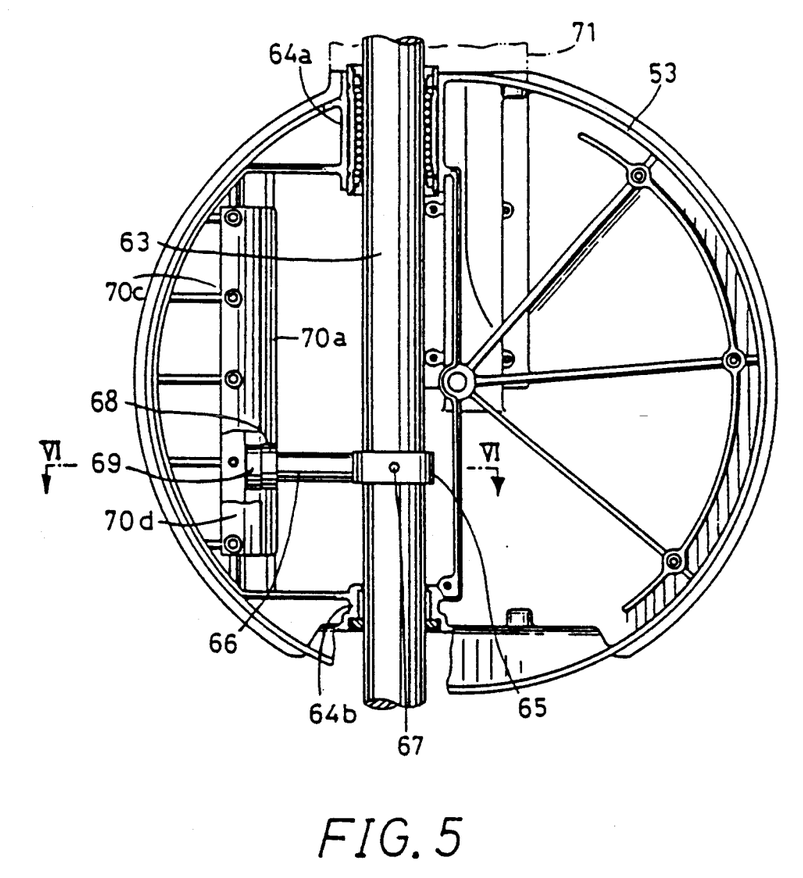
FIG. 5 is a bottom view partly in section illustrating the turntable.

A cylindrical slide bar 63 is provided within the turntable, extending diametrically of the turntable 53 at a position spaced a predetermined distance away from the cut-out recess 61 to the left in FIG. 4. The slide bar 63 is supported through a first bearing set 64a composed of a linear ball bearing located adjacent the front end of the slide bar 63 and a second bearing set 64b composed of a bearing metal located adjacent the rear end, so that the slide bar 63 may be slidable in the diametrical direction of the turntable 53.

Figure 6:
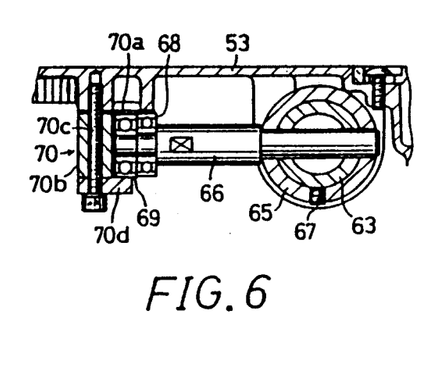
FIG. 6 is an enlarged sectional view taken along the line VI—VI in FIG. 5.
Figure 7:
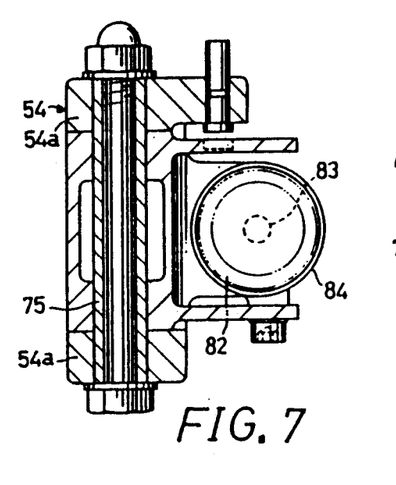
FIG. 7 is an enlarged sectional view taken along the line VII—VII in FIG. 2.

A lock ring 65 is fitted on the slide bar 63 rotatably in the circumferential direction of the slide bar 63. A support shaft 66 is inserted rotatably about its axis into the lock ring 65 and the slide bar 63 in the diametrical direction thereof. A set bolt 67 is threaded in the periphery of the lock ring 65 and adapted to be fastened to fix the lock ring 65 and the support shaft 66 to the slide bar 63. The support shaft 66 has an end projection on which is fitted a first guide bearing 68 having a center positioned in alignment with the central axis of the support shaft 66 and on which is also fitted a second guide bearing 69 located outside of the first guide bearing 68 and slightly eccentrically from the center of the first guide bearing 68. The first and second guide bearings 68 and 69 of this arrangement are rotatably received in a guide rail 70 provided in the turntable 53 and extending in parallel and in spaced relation to the slide bar 63. Specifically, as shown in FIG. 6, the guide rail 70 includes a long metal plate 70a defining an upper rail surface in the turntable 53 on the bottom surface thereof and a long guide plate 70d fixedly secured through a plurality of sleeves 70b and bolts 70c to the metal plate 70a in spaced and opposed relation thereto so as to define a lower rail surface. The first guide bearing 68 and the second guide bearing 69 are assembled to be rotatingly moved along the upper rail surface defined by the metal plate 70a and along the lower rail surface defined by the guide plate 70d, respectively. This arrangement can effectively prevent rotation of the slide bar 63 about its axis and rattling thereof caused by diametrical movement or sliding of the slide bar 63 in relation to the turntable 53. The space between the upper rail surface defined by the metal plate 70a and the lower rail surface defined by the guide plate 70d is set to be slightly larger than the outer diameter of the guide bearings 68, 69 and slightly smaller than the total of the outer diameter of the guide bearings 68, 69 and the eccentric distance therebetween. In assembling, the support shaft 66 is pivoted about its axis, with the first and second guide bearings 68, 69 being assembled to be rotatingly moved along the upper rail surface defined by the metal plate 70a and along the lower rail surface defined by the guide plate 70d. Then, the set bolt 67 is threadedly fastened to fix the lock ring 65 and the support shaft 66 to the slide bar 63. A cover plate 52a is provided between the turntable 53 and the base 52 to cover a half portion of the turntable in which the slide bar 63 is disposed, so that the first and second bearing sets 64a and 64b, the guide rail 70 and the first and second bearings 68 and 69 may be kept free from dirt and dust. A fence member 53a is mounted on the upper surfaces of the fixed base 52 and the turntable 53.

A protection cover 71 is attached to the front end surface of the turntable 53 in alignment with the slide bar 63 so as to cover a portion of the slide bar 63 projecting beyond the turntable 53. The protection cover 71 is a substantially box-like member of a synthetic resin having an upper surface positioned substantially in the same plane as the upper surface of the turntable 53 and a cut-out groove 72 extending in alignment with the opening defined in the cover plate 62 fitted on the cut-out recess 61.

The slide bar 63 has a rear end projecting beyond the rear end of the turntable 53, and a fixed bracket 73 is vertically mounted on the rear end of the slide bar 63. The movable arm 54 generally of an arcuate configuration extends in parallel to the slide bar 63 and upwardly away from the turntable 53, and is connected to the fixed bracket 73 through a support bolt 73b at a position slightly transversely and upwardly offset from the mounting position of the slide bar 63 for pivotal movement in the direction (left in FIG. 4) perpendicular to the axis of the slide bar 63. The movable arm 54 can be kept at a certain position relative to the fixed bracket 73 by a locking bolt 73a having a lever and inserted through the fixed bracket 73 to be threaded in the movable arm 54. The movable arm 54 is formed with two brackets 54a projecting substantially from the front upper end thereof and having upper ends between which a unit housing 74 of the miter saw unit 57 is vertically pivotally supported at the rear end thereof through a support shaft 75.

A motor housing 76 is mounted on the unit housing 74 of the miter saw unit 57 perpendicularly to the unit housing 74 or longitudinally of the base 52, and an electric motor constituting the drive means 56 is encased in the motor housing 76. The motor has a motor shaft 77 extending into a gear housing attached to the motor housing 76 in which the motor shaft 77 is in mesh with a reduction gear 78. The reduction gear 78 has an output shaft 79 extending into a blade case 80 attached to the gear housing in which a circular saw blade 81 is exchangeably mounted on the end of the output shaft 79. The blade case 80 is so designed as to cover substantially half the circular saw blade 81.

Figure 1:
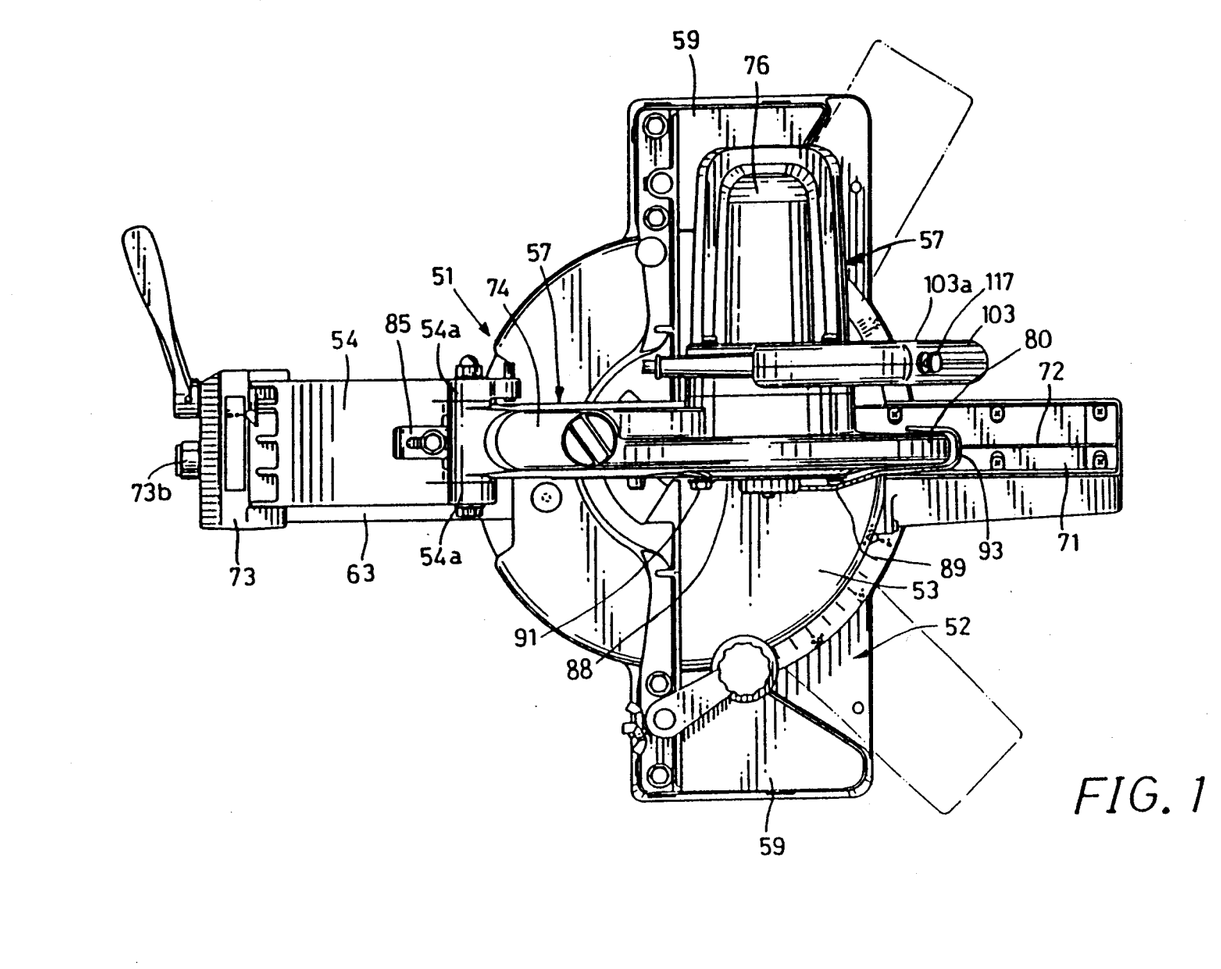
FIG. 1 is a plan view of a sliding bench miter saw in accordance with a preferred embodiment of the present invention.
Figure 2:
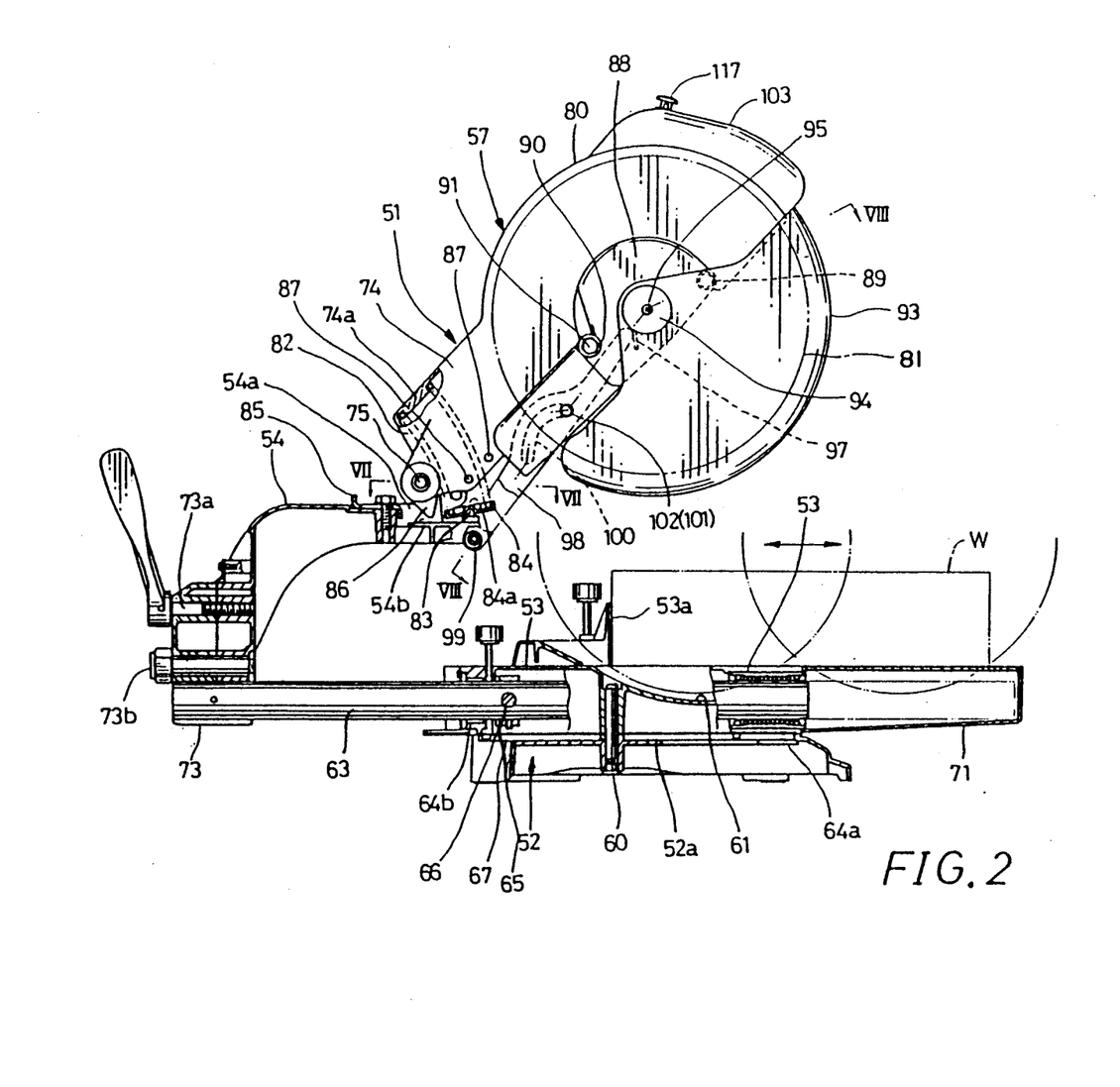
FIG. 2 is a front view partly in section of the sliding bench miter saw in FIG. 1.
Figure 3:
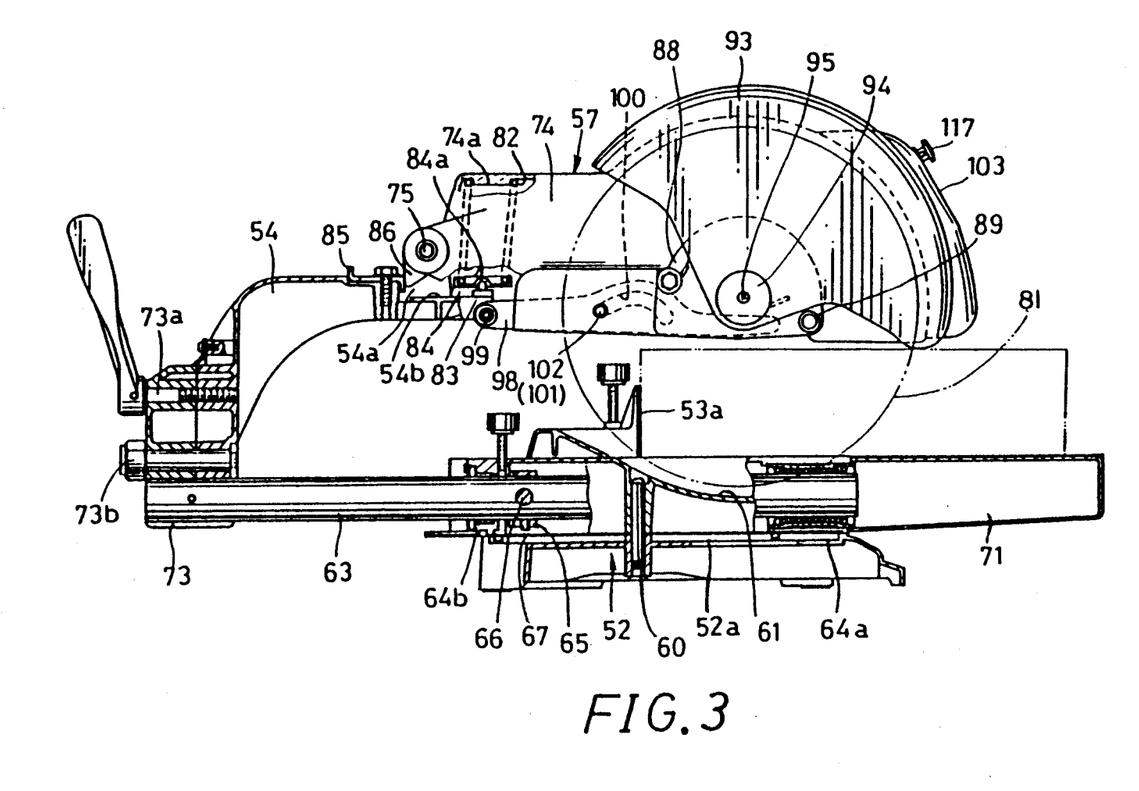
FIG. 3 is a view similar to FIG. 2 illustrating the miter saw in the operational position.

The unit housing 74 of the miter saw unit 57 has a rear end portion in form of a box having an open bottom and formed at the upper inside wall with an integrally formed spring bearing 74a substantially in form of a boss. A compression spring 82 is disposed in the interior of the box at the rear end of the unit housing 74 so as to normally urge the miter saw unit 57 for upward swinging movement, and extends in the direction of the swinging movement. The compression spring 82 has one end (upper end in FIG. 2) loosely supported by the spring bearing 74a and the other end (lower end in FIG. 2) held by the upper surface of a dish-like bearing member 84 supported by a support pin 83 which extends from a front stepped upper surface 54b of the movable arm 54 through a bracket. As shown in FIG. 2, the bearing member 84 is formed at the central portion of the lower surface thereof with a recess 84a in which a semicircular upper end of the support pin 83 is fitted. With this arrangement, the bearing member 84 holding the lower end of the compression spring 82 is pivotally supported for plane swinging movement relative to the support pin 83 in correspondence with the movement of the compression spring 82. A stopper 85 is mounted on the front stepped portion of the movable arm 54 through a bolt, the length of projection thereof being adjustable. An abutment 86 is mounted on the support shaft 75 of the unit housing 74 and has a tapered extreme end which may be brought in abutting engagement with the stopper 85 so as to restrict the extent of the downward swinging movement of the miter saw unit 57. The extent of the upward swinging movement of the miter saw unit 57 is restricted by an arrangement comprising a control slot 100 formed in an actuating link 98 which will be described later and a guide roller 102 supported in the control slot 100 through a support shaft 101, substantially as shown in FIG. 2.

The unit housing 74 has two through holes 87 disposed substantially below the compression spring 82 to be used for assembling of the compression spring 82. In assembling of the compression spring 82, prior to mounting of the unit housing 74 of the miter saw unit 57 on the movable arm 54, the compression spring 82 is fitted in compressed condition in the unit housing 74, with one end loosely supported by the spring bearing 74a. Then, pins of an assembling tool (not shown) are inserted through the through holes 87 to have the other end of the compression spring 82 held through the bearing member 84, so that the compression spring 82 may be kept in the compressed condition. With the spring 82 kept in this condition, the unit housing 74 is attached to the movable arm 54, and the upper end of the support pin 83 is fitted in the recess 84a of the bearing member 84. Then, the pins of the assembling tool (not shown) are extracted from the through holes 87 to complete assembling of the compression spring 82 and the bearing member 84. In case the biasing force of the compression spring 82 is relatively small, the assembling process as described above will not be necessary, but the compression spring 82 can be directly assembled to a predetermined position.

Figure 8:
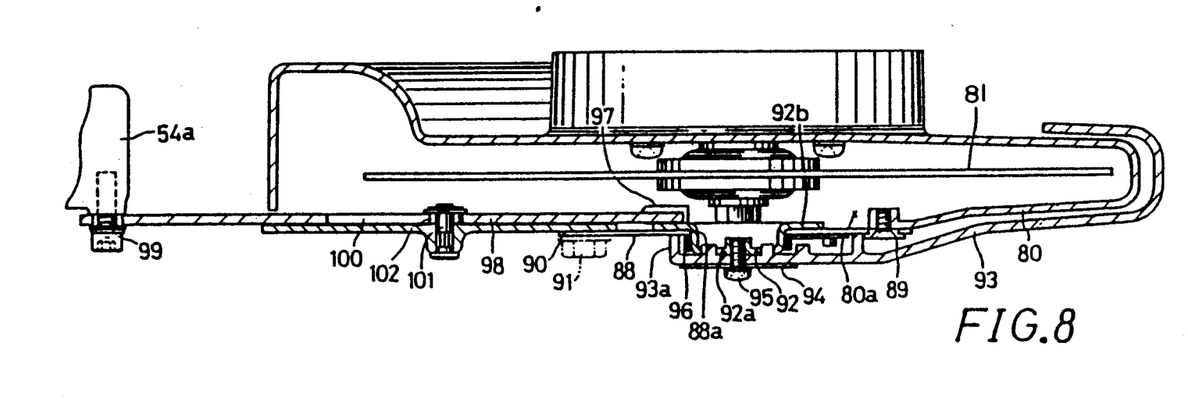
FIG. 8 is an enlarged sectional view taken along the line VIII—VIII in FIG. 2.
Figure 9:
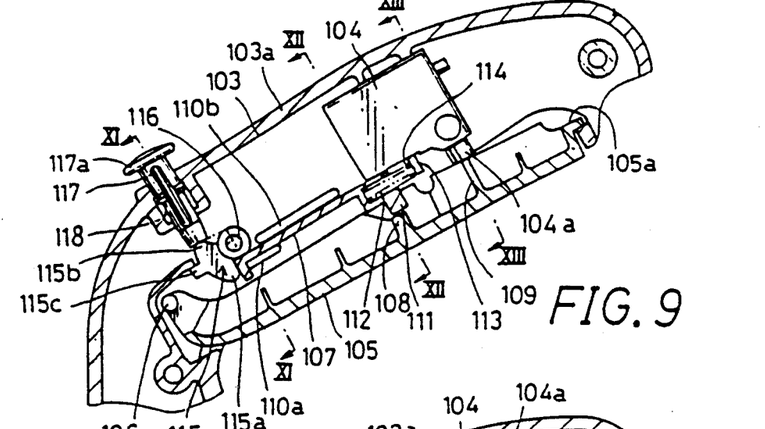
FIG. 9 is an enlarged sectional view of the control handle.

As shown in FIGS. 2, 4 and 8, the blade case 80 has a cutout portion 80a formed generally in opposed relation to the central mounting portion of the saw blade 81. A substantially elliptical mounting plate 88 is provided generally in opposed relation to the cutout portion 80a and is adapted to mount a safety cover which will be described later. Specifically, the mounting plate 88 is pivotally supported at one end to the blade case 80 through a support screw 89, and the other end of the mounting plate 88 forms a hooked engaging portion 90 which is releasably fastened to the blade case 80 by a locking bolt 91. The mounting plate 88 has a large-diameter central opening 88a formed in alignment with the central mounting portion of the saw blade 81. A mounting cap 92 serving as a central cap is fitted in the opening 88a, having a flange portion 92b disposed in abutment with the back surface of the mounting plate 88 and a boss portion 92a rotatably projecting outwardly through the opening 88a. A substantially sectorial safety cover 93 is provided and is adapted to cover from outside of the blade case 80 a portion of the saw blade 81 exposed from the blade case 80. Specifically, the safety cover 93 has a central mounting portion and an inwardly bent portion 93a formed at the end thereof, and is fixedly fastened to the mounting cap 92 through a washer 94 by a screw 95, having the central mounting portion disposed in abutment with the front surface of the boss portion 92a of the mounting cap 92 and the bent portion 35a in contact with the mounting plate 88. With this arrangement, the safety cover 93 is pivotal along with the mounting cap 92 about the opening 88a of the mounting plate 88 in relation to the blade case 80. The boss portion 92a of the mounting cap 92 is encircled by a spiral spring 96 having one end fixed to the mounting plate 88 and the other end to the safety cover 93 and adapted to impart to the safety cover 93 biasing force in the clockwise direction in FIG. 2 to cause swinging return movement thereof, so that the safety cover 93 may normally cover from outside of the blade case 80 the portion of the saw blade 81 exposed from the blade case 80.

The mounting cap 92 is provided at the back surface of the flange portion 92b with a control contact plate 97 projecting therefrom and adapted to be abuttingly engaged with one end of the actuating link 98. Specifically, as shown in FIGS. 2 and 8, the actuating link 98 has the one end located in the blade case 80 in opposed relation to the control contact plate 97 so as to be brought in abutting engagement therewith and the other end pivotally connected through a support pin 99 to the extreme end of the front stepped upper surface 54b of the movable arm 54. The actuating link 98 has substantially in the central portion thereof an arcuate control slot 100 extending in the longitudinal direction of the actuating link 98. A guide roller 102 is supported to the blade case 80 through a support shaft 101 and rotatably fitted in the control slot 100. The control slot 100 has at one end thereof an arcuate portion whose radius of curvature is smaller than that of the other arcuate portion. As the unit housing 74 of the miter saw unit 57 is pivotally lowered, the actuating link 98 thus constructed is pivoted about the support pin 99 under the control of the guide roller 102 fitted in the control slot 100, and, through the one end of the actuating link 98 in abutting engagement with the control contact plate 97 of the mounting cap 92, causes the safety cover 93 along with the mounting cap 92 to be pivoted counterclockwise in FIG. 2 against the biasing force of the spiral spring 96, so that the cutting edge of the saw blade 81 is exposed.

The motor housing 76 is formed with a control handle 103 which projects from a portion of the periphery thereof in the same direction as the unit housing 74 and has both ends integral with the periphery of the motor housing 76. The control handle 103 is provided with a trigger 105 for actuating a switch 104 to start or stop the electric motor. As shown in FIGS. 9 to 13, the control handle 103 has a downwardly opening gripping portion 103a, and the trigger 105 is located to completely close the opening of the gripping portion 103a in such a manner as to project therefrom. The trigger 105 is pivotally supported at one end thereof through a support pin 106 and is formed side by side on the inner surface with a first rib 108 provided in opposed relation to a control plate 107 which will be described later so as to be brought in abutting engagement therewith and a second rib 109 kept in abutting engagement with an actuating stick 104a of the switch 104. The other end of the trigger 105 has a flange 105a which is in abutting engagement from inside with the peripheral edge of the opening of the gripping portion 103a so as to prevent movement of the trigger 105 away from the gripping portion 103a.

A control plate 107 is provided in the gripping portion 103a of the control handle 103 above the trigger 105 and is supported through guide pieces 110a, 110b movably substantially in parallel to the trigger 105. The control plate 107 has one end bent substantially at right angles and disposed in opposed relation to one of the guide pieces 110a so as to be brought in abutting engagement therewith and the other end formed with a check projection 111 adapted to be brought in abutting engagement with the first rib 108 of the trigger 105. The other end of the control plate 107 has a hole 112, and a spring 114 is resiliently provided between the hole 112 and a projecting piece 113 projecting from the inner wall of the gripping portion 103a, so that the control plate 107 may be normally urged to the left in FIG. 9.

A substantially sectorial control cam plate 115 is provided above the one end of the control plate 107 and pivotally supported through a support pin 116. The control cam plate 115 is formed at one side thereof with a first cam surface 115a adapted to be brought in abutting engagement with the bent end of the control plate 107 and at the other side thereof with a second cam surface 115b disposed in opposed relation to the lower end of a lock-off pin 117 which will be described later. The control cam plate 115 is further formed at the intermediate portion thereof with a projection 115c adapted to be brought in abutting engagement with the peripheral edge of the opening of the gripping portion 103a of the control handle 103 so as to restrict the extend of the pivotal movement of the control cam plate 115.

The control handle 103 further has a stepped hole 118 formed through the gripping portion 103a above the control cam plate 115, and a lock-off pin 117 in form of a stepped stem is vertically movably inserted through the stepped hole 118. As described above, the lock-off pin 117 has the lower end being in abutting engagement with the second cam surface 115b of the control cam plate 115 and the upper end projecting beyond the upper surface of the gripping portion 103a to form a large-diameter knob 117a. With this arrangement, the control plate 107 is normally urged to the left in FIG. 9 under the biasing force of the spring 114, so that the control cam plate 115 is pivoted clockwise in FIGS. 9 and 10 to keep the lock-off pin 117 in its raised position, and the check projection 111 of the control plate 107 is located in opposed relation to the first rib 108 of the trigger 105 so as to prevent depression of the trigger 105. When the lock-off pin 117 is depressed to pivot the control cam plate 115 counterclockwise in FIGS. 9 and 10, the first cam surface 115a causes the control plate 107 to be moved to the right in FIGS. 9 and 10 against the biasing force of the spring 114, so that the check projection 111 is released from the opposed relation to the first rib 108 of the trigger 105 so as to permit depression of the trigger 105. In this condition, the trigger 105 is operable for on-off control of the switch 104 to start and stop the electric motor.

The operation of the sliding miter saw 51 thus constructed will now be described as to the forced cutting operation which is a typical function of the sliding miter saw 51.

With the miter saw 51 in the position shown in FIG. 2, a workpiece W to be cut is put on the turntable 53 and the base 52 and properly clamped by clamping means.

When the miter saw unit 57 is in its uppermost position relative to the movable arm 54 (FIG. 14A), the operator draws the miter saw unit 57 through the control handle 103 in the forward direction of the turntable 53 (right in FIG. 2), so that the slide bar 63 connected as a unit to the miter saw unit 57 through the movable arm 54 and the fixed bracket 73 is slidingly advanced in the forward direction of the turntable 53, guided in relation to the turntable 53 by the first and second guide bearings 68, 69 rotatingly moved along the guide rail 70. (See phantom lines in FIG. 2).

In this condition, the front end of the slide bar 63 is largely projected beyond the front end surface of the turntable 53, but as the projected front end is completely protected by the protection cover, it will cause no danger to the operator.

Figure 10:
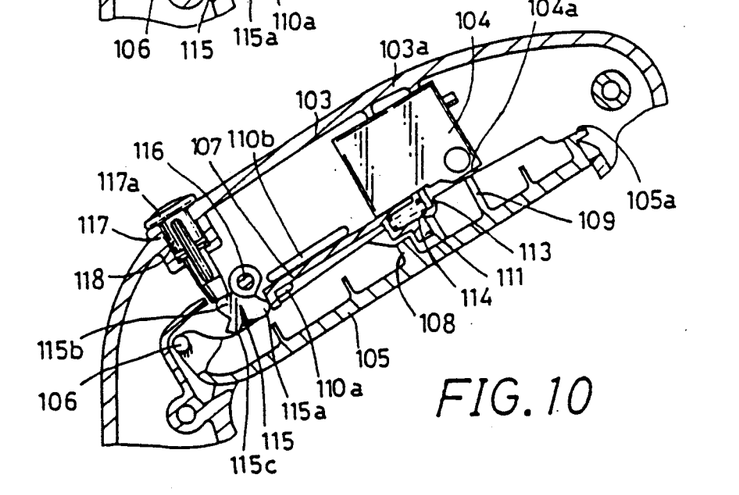
FIG. 10 is a view similar to FIG. 9 illustrating the trigger in its operational position.
Figure 11:
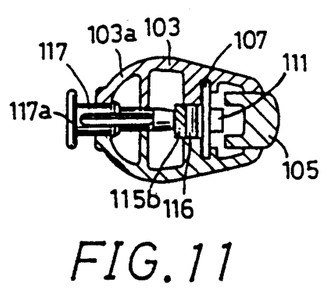
FIG. 11 is a sectional view taken along the line XI—XI in FIG. 9.
Figure 12:
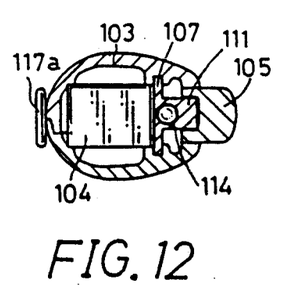
FIG. 12 is a sectional view taken along the line XII—XII in FIG. 9.
Figure 13:
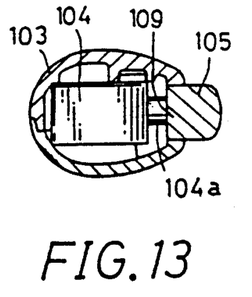
FIG. 13 is a sectional view taken along the line XIII—XIII in FIG. 9.

When the lock-off pin 117 on the gripping portion 103a of the control handle 103 is depressed by a finger of the hand gripping the gripping portion 103a or the like to pivot the control cam plate 115 counterclockwise in FIG. 2, the first cam surface 115a causes the control plate 107 to be moved to the right in FIG. 2 against the biasing force of the spring 114, so that the check projection 111 is released from the opposed relation to the first rib 106 of the trigger 105 to permit depression of the trigger. In this condition, the trigger 105 is depressed to turn on the switch 104 for starting of the electric motor (FIG. 10). The miter saw unit 57 is lowered or pushed down through the control handle 103 toward the turntable 53 and the compression spring 82 is further compressed, the miter saw unit 57 is swung in relation to the movable arm 54 toward the turntable 53 along a pivotal path about the support shaft 75.

During this movement, the compression spring 82 is wholly so deflected as to be further compressed. As the bearing member 84 holding the lower end of the spring 82 is pivotally supported by the support pin 83 for plane swinging movement, it can be pivoted in correspondence with any deflection of the compression spring 82 so as to hold the whole lower end surface of the compression spring 82 at all times.

As the miter saw unit 57 is swung, the actuating link 98 is gradually pivoted in the same direction about the support pin 99 under the control of the guide roller 102 fitted in the control slot 100. At this time, as the arcuate portion of the control slot 100 at the one end thereof is smaller in radius of curvature than the other arcuate portion, the pivotal movement of the actuating link 98 is performed rapidly through a large angle. As the pivoting actuating link 98 has the one end kept in abutting engagement with the control contact plate 97 of the mounting cap 92, the pivotal movement of the actuating link 98 causes the control contact plate 97 to be pushed to impart rotational force to the mounting cap 92, so that the safety cover 93 along with the mounting cap 92 is pivoted counterclockwise in FIG. 2 about the opening 88a of the mounting plate 88 against the biasing force of the spiral spring 96. Thus, the cutting edge of the circular saw blade 81 is widely exposed for starting the cutting operation (FIG. 14B).

This condition is maintained, as long as the miter saw unit 57 is swung and consequently the actuating link 98 is imparting rotational force to the mounting cap 92 through the control contact plate 97. In this condition, the safety cover 93 is positively pivoted to gradually increase the exposed portion of the cutting edge of the circular saw blade 81 so as to proceed the cutting operation. At this time, as the guide roller 102 gradually rotatingly moves along the control slot 100 from the arcuate portion at the one end to the other arcuate portion having a large-radius of curvature, the pivotal movement of the actuating link 98 goes along with that of the miter saw unit 57.

Figure 14A:
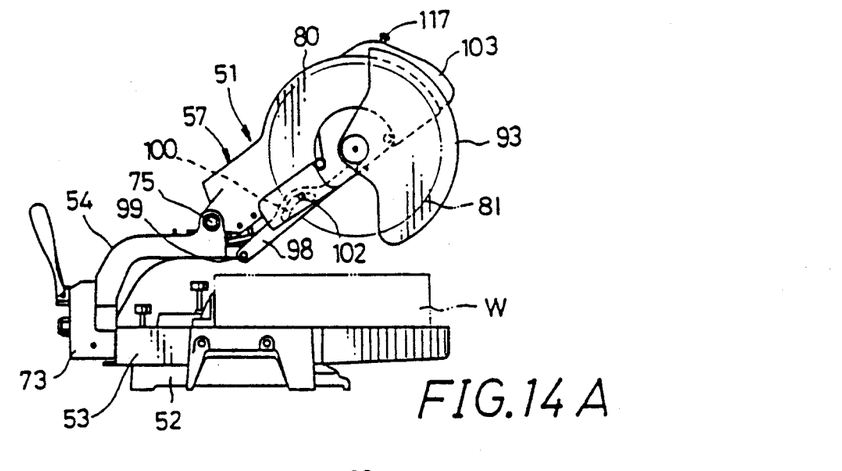
FIGS. 14A to 14C are views illustrating various operational positions of the safety cover.
Figure 14B:
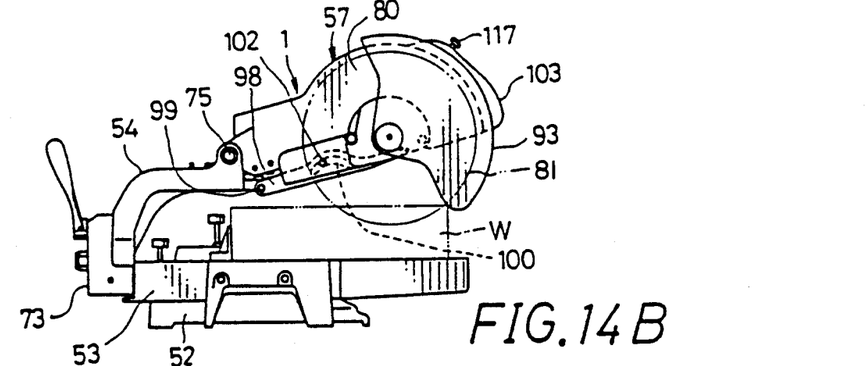

When the miter saw unit 57 comes near the fully lowered position, the actuating link 98 has its one end extending in parallel in contact with the control contact plate 97 and no further pushes the control contact plate 97, and consequently ceases to impart rotational force to the mounting cap 92, so that the safety cover 93 is maintained in the pivoted position (FIG. 14B).

In this condition, the operator then pushes the miter saw unit 57 through the control handle 103 in the backward direction of the turntable 53 (left in FIG. 2), so that the slide bar 63 is slidingly moved backward of the turntable 53, guided in relation to the turntable 53 by the first and second guide bearings 68, 69 rotatingly moved along the guide rail 70 and the saw blade 81 is moved backward along therewith to complete the forced cutting operation.

Figure 14C:
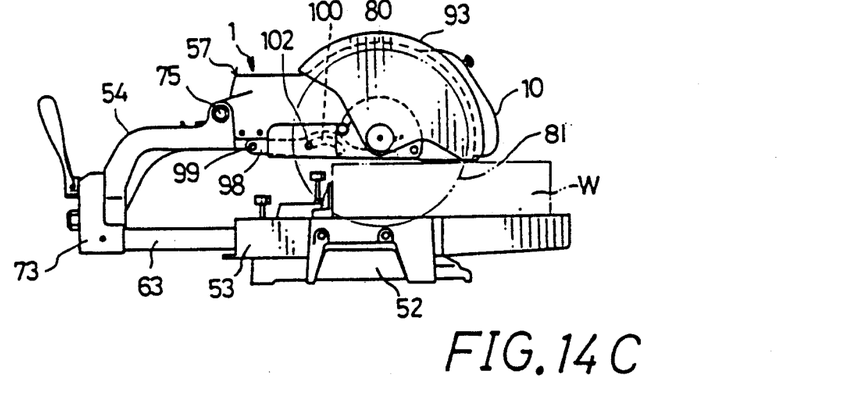

At this time, safety cover 93 is out of restriction by the actuating link 98 and, with the end riding on the upper surface of the workpiece W, is independently pivoted in abutment with the upper surface of the workpiece W and moved backward along with the miter saw unit 57 (FIG. 14C).

As the cutting operation for the workpiece W is completed and the miter saw unit 57 is released from its swinging movement, the miter saw unit 57 is pivotally returned to its original position under the returning resilient force of the compression spring 82. As this occurs, the safety cover 93 is pivotally returned to its original position under the biasing force of the spring 96 so as to cover from outside of the blade case 80 the exposed portion of the saw blade 81 from the blade case 80.

As the miter saw unit 57 and the safety cover 93 are pivoted to their respective original positions, the actuating link 98 is returned to its original position. At this time, the compression spring 82 is wholly deflected under its returning resilient force, but as the bearing member 84 holding the lower end of the spring 82 is pivotally supported by the support pin 83 for plane swinging movement, it can be pivoted in correspondence with any deflection of the compression spring 82 so as to hold the whole lower end surface of the compression spring 82 at all times.

In the above embodiment, usual cutting operation other than the forced cutting can be also performed.

Furthermore, in the above embodiment, one of the supporting points for the slide bar 63 on the turntable 53 (the first bearing set 64a in this embodiment) is disposed so that the supporting point may come as close as possible to the point where various loads including cutting resistance during cutting operation, dead weight of the whole drive means, and pushing force exerted by the operator through the control handle 103 are exerted on the rotary tool 55. Therefore, in the forced cutting operation, the loads are applied to a position adjacent the outer end of the first bearing set 64a when the slide bar 63 is located at its foremost position, and they are applied to a position adjacent the inner end of the first bearing set 64a when the slide bar 63 is at its rearmost position. In other words, the above loads on the rotary tool 81 are supported at the positions adjacent the supporting point for the slide bar 63, so that there is no fear of irregular loading on the slide bar 63 which would cause "deflection" thereof. Thus, possibility of such deflection of the slide bar can be substantially eliminated, assuring smooth sliding movement thereof.

In this embodiment, the single slide bar 63 is guided by the first and second guide bearings 68, 69 eccentric to each other and rotatingly movable along the guide rail 70, permitting smoother sliding movement of the slide bar 63. Specifically, the distance from the upper rail surface of the metal plate 70a to the lower rail surface of the guide plate 70d is so defined as to be slightly larger that the outer diameter of the guide bearings 68, 69 but slightly smaller than the total of the outer diameter of the guide bearings 68, 69 and the eccentric distance therebetween. In assembling, the support shaft 66 is adjusted to rotate about its axis, with the first guide bearing 68 rotatingly movable along the upper rail surface of the metal plate 70a and the second guide bearing 69 rotatingly movable along the lower rail surface of the guide plate 70d, and then, the set bolt 67 is threadedly fastened to fixedly secure the lock ring 65 and the support shaft 66 to the slide bar 63. This assures assembling without "backlash" of the slide guide means, and consequently, the above effect can be achieved.

In the above embodiment, the vertically swinging movement of the miter saw unit 57 causes deflection of the whole compression spring 82, but as the bearing member 84 holding the lower end of the compression spring 82 is pivotally supported by the support pin 83 for plane swinging movement, it can be pivoted in correspondence with any deflection of the compression spring 82 so as to hold the whole lower end surface of the compression spring 82 at all times.

Therefore, the resilient force is effectively imparted to the miter saw unit 57, so that vertically swinging movement of the miter saw unit 57 can be performed smoothly. Furthermore, as the miter saw unit 57 is vertically swung, the safety cover 93 covering the circular saw blade 81 is positively pivoted in correspondence with the swinging movement of the miter saw unit 57 associated with the cutting operation by the saw blade 81, so that the forced cutting operation through silding of the slide bar 63 can be performed effectively and safely.

Furthermore, the slide bar 63 is offset on the side of the turntable 63 to which the miter saw unit 57 can be swung, that is, on the left side of the cut-out recess 61, as shown in FIG. 4. When swinging movement of the miter saw unit 57 to the left of the cut-out recess 61 (to the left in FIG. 4) occurs, the moment can be reduced, and consequently smooth slide of the slide bar 63 can be achieved. Further, the movable arm 54 may be long enough to reduce the load on the first bearing set 64a for supporting the slide bar 63.

Although the slide bar 63 is located on the right-hand side of the cut-out recess 61 as viewed in FIG. 4, it may be located on the motor housing 76 side of the miter saw unit 57.

Having thus described the preferred embodiment of the invention, it should be understood that numerous structural modifications and adaptations may be made without departing from the spirit of the invention.

What is claimed is:

1. A miter saw comprising:

a base including a mounting cavity having a bottom and openings upwardly and in the front and rear sides, said base including a pair of projections formed on the right and left sides of said mounting cavity and having upper surfaces serving as workpiece supporting surfaces;

a turntable rotatably mounted within said mounting cavity and having an upper surface positioned in the same plane as the workpiece supporting surfaces of said projections, said turntable having an opening formed in the upper surface thereof and extending in the diametrical direction thereof, said turntable having a vertical wall formed on the peripheral side thereof which is of a height substantially equal to that of the mounting cavity;

a slide member extending through the vertical wall in a substantially diametrical direction of the turntable and slidable through the openings of the front and rear sides of said base;

an arm mounted on the rear end of said slide member; and a miter saw unit located above said turntable and mounted on said arm for swinging movement in a vertical plane, said miter saw unit having a cutting tool which may enter the opening of said turntable when said miter saw is swung downwardly.

2. The miter saw as defined in claim 1, wherein a supporting portion of said slide member with respect to said turntable is located at a position in the vicinity of a load application point of said cutting tool.

3. The miter saw as defined in claim 1, wherein a supporting portion of said slide member with respect to said turntable is formed at at least two positions.

4. The miter saw as defined in claim 1, wherein said slide member comprises a single slide bar located slightly offset sidewardly from a vertical swing locus of said cutting tool relative to said turntable.

5. A miter saw comprising:

a base including a mounting cavity having a bottom and openings upwardly and in the front and rear sides, said base including a pair of projections formed on the right and left sides of said mounting cavity and having upper surfaces serving as workpiece supporting surfaces;

a turntable rotatably mounted within said mounting cavity and having an upper surface position in the same plane as the workpiece supporting surfaces of said projections, said turntable having an opening formed in the upper surface thereof and extending in the diametrical direction thereof, said turntable having a vertical wall formed on the peripheral side thereof which is of a height substantially equal to that of the mounting cavity;

a slide bar extending through the vertical wall in a substantially diametrical direction of the turntable and slidable through the openings of the front and rear sides of said base;

an arm mounted on the rear end of said slide bar;

a miter saw unit located above said turntable and mounted on said arm for swinging movement in a vertical plane, said miter saw unit having a cutting tool which may enter the opening said turntable when said miter saw is swung downwardly; and means for guiding a sliding operation of said slide bar while restricting rotation of said slide bar about its axis 6. A miter saw comprising a base for placing a workpiece thereon, a substantially circular turntable mounted on said base, a single slide bar radially slidably supported in said turntable, an arm mounted to said slide bar, a miter saw unit provided above said turntable and vertical swingably mounted to said arm in such a manner as to be opposed to said turntable, said miter saw unit having a cutting tool such as a circular saw blade and a driving means for driving said cutting too, and means for guiding a sliding operation of said slide bar as restricting rotation of said slide bar about its axis, wherein said guiding means comprises a guide rail formed on said turntable and extending parallel to said slide bar, a ring member rotatably engaged with said slide bar, a support shaft extending from at least said ring member in such a manner as to be rotatable about an axis of said ring member, at least two guide bearings mounted on said support shaft and adapted to be rolled on said guide rail, and a set bolt for inhibiting rotation of said ring member relative to said slide bar, wherein at least one of said guide bearings is located eccentrically from an axis of said support shaft.

* * * * *